Aug. 1, 1933. D. THOMPSON 1,920,608

BATTERY CONNECTION

Filed Nov. 28, 1930

Inventor:
Dorsey Thompson,
By Jas. C. Wobensmith
Attorney.

Patented Aug. 1, 1933

1,920,608

UNITED STATES PATENT OFFICE 1,920,608

BATTERY CONNECTION

Dorsey Thompson, Philadelphia, Pa.

Application November 28, 1930
Serial No. 498,581

8 Claims. (Cl. 173—259)

My invention relates to battery connections, that is to say, to devices used for connecting the cables to the terminal posts of storage batteries, such for example as are used in automobiles and the like.

The principal object of my invention is to provide a simple and efficient battery connection which, while adaptable for making connections of a permanent character, is also suitable for emergency use, whereby the cables may be readily and expeditiously connected to the terminal posts of storage batteries, in the event that the connection lugs initially provided become corroded and eaten away.

A further object of my invention is to provide a battery connection which will be relatively inexpensive, and which may be readily attached, and a secure mechanical and electrical connection made by means of the tools usually carried in an automobile tool kit.

The nature and characteristic features of my invention will be more readily understood from the following description, taken in connection with the accompanying drawing forming part hereof, in which.

Figure 1:
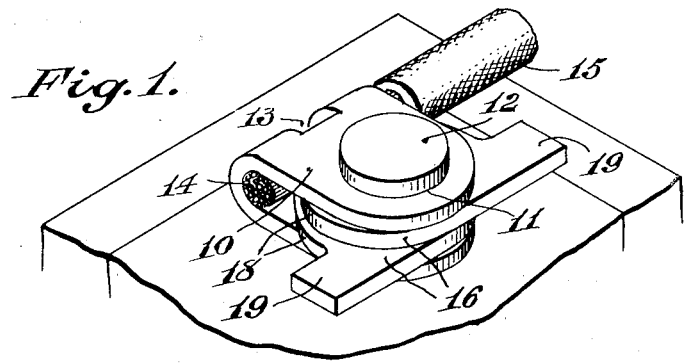
Figure 1 is a perspective view illustrating a preferred form of battery connection embodying the main features of my present invention attached to one of the terminal posts of a storage battery.
Figure 2:
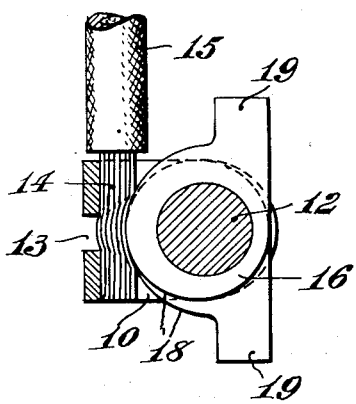
Fig. 2 is a horizontal section, showing the internal arrangement.
Figure 3:
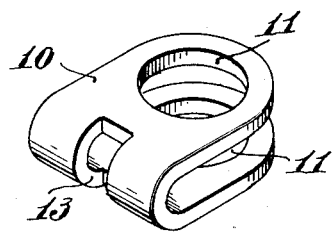
Fig. 3 is a perspective view of one of the members of the device, detached.

Referring now more particularly to Figs. 1 to 4 of the drawing, the device there shown includes a member 10, shown in detached perspective in Fig. 3. The member 10 is preferably made of sheet metal, U-shaped in vertical cross section. The horizontal arms of the member 10 are provided with apertures 11 which are adapted to fit the terminal post 12 of the battery.

The loop portion of the member 10 is centrally recessed, as at 13, for a purpose to be presently explained. The end 14 of the cable 15 is positioned in the loop portion of the member 10, and is clamped therein by means of a pair of clamping members 16, shown in detached perspective in Fig. 4 of the drawing.

Each of the members 16 is provided with an aperture 17, by means of which the members 16 are mounted on the terminal post 12, being disposed between the horizontally extending arms of the member 10, as shown in Fig. 1 of the drawing. Each of the members 16 is also provided with an eccentric peripheral surface 18, to effect the clamping operation. To facilitate the manipulation of the clamping members 16, each of said members is preferably provided with an extending arm 19.

When it is desired to use the device to effect the connection, the insulation is stripped from the end 14 of the cable 15, and the stripped end is then inserted in the loop portion of the member 10. The clamping members 16 are now positioned between the arms of the member 10, with their apertures 17 in register with the apertures 11 of the member 10. The members 16 are initially placed in such position that the assembled device may be placed on the terminal post 12 of the battery.

After the device, assembled as above, is placed upon the terminal post 12 of the battery, the clamping members 16 are turned, preferably simultaneously, so as to eliminate side strain on the terminal post as the same are forced to the clamping position. The members 16 are rotated about the terminal post as an axis, by engaging the extending arms 19 of the members 16 with wrenches, pliers, or other suitable tools.

It will be noted that, by reason of the provision of the recess 13 in the loop portion of the member 10, the strands of the end 14 of the cable 15 which is mounted therein will be deformed into the recess, thereby locking the end of the cable more securely against longitudinal movement.

Figure 5:
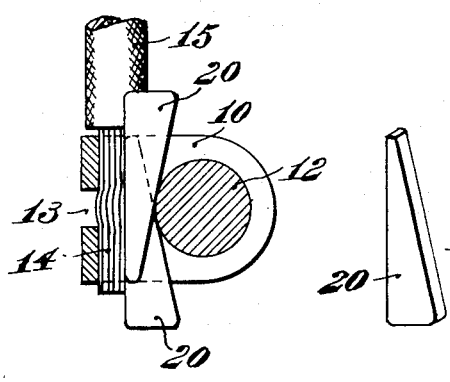
Fig. 5 is a view similar to Fig. 2, illustrating a modified form of the invention.
Figure 4:
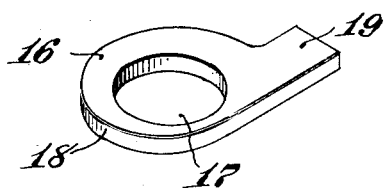
Fig. 4 is a similar perspective view of another of the members.
Figure 6:
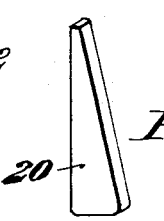
Fig. 6 is a perspective view illustrating one of the members used in connection with the arrangement shown in Fig. 5.

In Fig. 5 of the drawing, there is shown a modified form of the device, in which a pair of wedges 20 are used to effect the clamping operation, in lieu of the eccentrics shown in Figs. 1, 2 and 4 of the drawing, the action in this instance being similar to the wedging action provided by the eccentric portions of the member 16.

By the arrangement herein described, there is provided a simple, inexpensive, and efficient device for securing the ends of the connection cables to the terminal posts of storage batteries, which is so constructed and arranged that it may be quickly and easily attached, and which will insure a secure mechanical and electrical connection between the end of the cable and the terminal post of the battery.

I claim:

1. A device for connecting a cable to a terminal post of a storage battery comprising a U-shaped member having apertures in its arm portions adapted to engage the terminal post, and the loop portion thereof being adapted to receive the end of the cable, and a clamping member disposed between the arms of the U-shaped member having one surface engaging the terminal post and having another surface engaging the end of the cable and serving to clamp the end of the cable in the loop portion of the U-shaped member.

2. A device for connecting a cable to a terminal post of a storage battery comprising a U-shaped member having apertures in its arm portions adapted to engage the terminal post, and the loop portion thereof being adapted to receive the end of the cable, and a pair of clamping members oppositely disposed between the arms of the U-shaped member, said clamping members simultaneously engaging the terminal post and the end of the cable.

3. A device for connecting a cable to a terminal post of a storage battery comprising a U-shaped member having apertures in its arm portions adapted to engage the terminal post, and the loop portion thereof being adapted to receive the end of the cable, and a pair of clamping members oppositely disposed between the arms of the U-shaped member, said clamping members having apertures whereby the same engage the terminal post and having eccentric peripheral surfaces adapted to engage and clamp the end of the cable.

4. A device for connecting a cable to a terminal post of a storage battery comprising a U-shaped member having apertures in its arm portions adapted to engage the terminal post, and the loop portion thereof being adapted to receive the end of the cable, the loop portion having a transverse recess into which the end of the cable is adapted to be deformed to lock the same against longitudinal movement, and a clamping member disposed between the arms of the U-shaped member and simultaneously engaging the terminal post and the end of the cable.

5. A device for connecting a cable to a terminal post of a storage battery comprising a U-shaped member having apertures in its arm portions adapted to engage the terminal post, and the loop portion thereof being adapted to receive the end of the cable, the loop portion having a transverse recess into which the end of the cable is adapted to be deformed to lock the same against longitudinal movement, a pair of clamping members oppositely disposed between the arms of the U-shaped member, said clamping members having apertures whereby the same engage the terminal post and having eccentric peripheral surfaces adapted to engage and clamp the end of the cable.

6. A device for connecting a cable to a terminal post of a storage battery comprising a U-shaped member having apertures in its arm portions adapted to engage the terminal post, and the loop portion thereof being adapted to receive the end of the cable, the loop portion having a transverse recess into which the end of the cable is adapted to be deformed to lock the same against longitudinal movement, a pair of clamping members oppositely disposed between the arms of the U-shaped member, said clamping members having apertures whereby the same engage the terminal post and having eccentric peripheral surfaces adapted to engage and clamp the end of the cable, said clamping members also having extending arms for the manipulation of the same.

7. A device for connecting a cable to a terminal post of a storage battery comprising a U-shaped member having apertures in its arm portions adapted to engage the terminal post, and the loop portion thereof being adapted to receive the end of the cable, a wedge shaped clamping member disposed between the arms of the U-shaped member and simultaneously engaging the terminal post and the end of the cable.

8. A device for connecting a cable to a terminal post of a storage battery comprising a U-shaped member having apertures in its arm portions adapted to engage the terminal post, and the loop portion thereof being adapted to receive the end of the cable, a pair of wedge shaped clamping members oppositely disposed between the arms of the U-shaped member and simultaneously engaging the terminal post and the end of the cable.

DORSEY THOMPSON.